Sept. 3, 1968  S. F. SPENCER ET AL  3,399,974
GAS ANALYZER
Filed March 2, 1965

INVENTOR.

SAMUEL F. SPENCER
LOUIS MIKKELSEN

United States Patent Office 3,399,974
Patented Sept. 3, 1968

3,399,974
GAS ANALYZER
Samuel F. Spencer and Louis Mikkelsen, Wilmington, Del., assignors, by mesne assignments, to Hewlett-Packard Company, Palo Alto, Calif. a corporation of California
Filed Mar. 2, 1965, Ser. No. 436,471
12 Claims. (Cl. 23—254)

ABSTRACT OF THE DISCLOSURE

A flame ionization detector employs separate jets for the sample stream and combustible gas stream by directing the jets so that their axes intersect. A detector having an improved response time is obtained.

---

Figure 1:
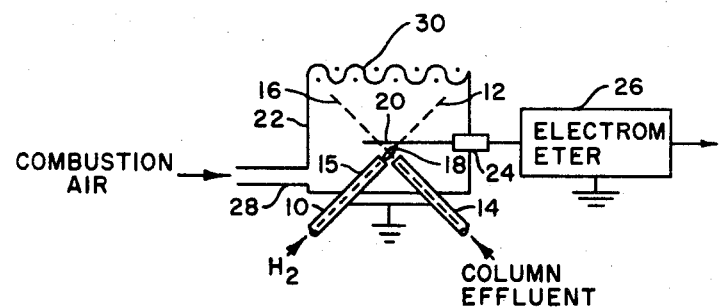

This invention relates to an apparatus for the continuous analysis of a fluid stream containing organic constituents and, more particularly, to an improved flame ionization detector having a faster response than has been possible heretofore.

Numerous flame ionization detectors have been constructed since the first one was described by McWilliams et al. in Nature, vol. 181, p. 760. Most of these detectors attempt to measure variations in the ionization or electrical conductivity of a burning hydrogen-oxygen jet which consumes the organic components of a sample stream. The resulting changes in flame ionization are proportional to the concentration of the organic sample constituents in the stream.

Many of these detectors have introduced the fluid stream to be analyzed into a combustible gas (usually hydrogen) stream to be burned in combustion air (usually oxygen or pure air). The degree of ionization in the resulting flame is measured by applying an electrical potential across the flame and measuring the resulting current flow. Since the current is typically small, it is passed through a high impedance and the voltage drop across the impedance amplified by an electrometer amplifier.

Flame ionization detectors are particularly useful in gas chromatography to analyze the sample stream or effluent of a separating column for changes in its constituency. Although these prior art flame ionization detectors have proven to be uniquely applicable to gas chromatography, they also have many disadvantages. It is an object of this invention to overcome many of these disadvantages.

For one thing, some of the earlier flame ionization detectors mixed the fluid stream, hydrogen, and oxygen together for burning. This created explosion hazards not only because of the mixture of hydrogen and oxygen alone, but also because of the possibility of the hydrogen gas diffusing back into the hot oven of the gas chromatograph. Aside from the explosion hazards, both hydrogen and oxygen tend to react chemically with many of the organic compounds thereby reducing the accuracy of any results. In gas chromatographic systems where high column efficiency is an object any excess internal volume is undesirable. Such volume is particularly undesirable if it is not directly and continually purged. One of the areas in which such volume is found in conventional detection systems is in the mixing chamber for hydrogen and column effluent gases. Any excess volume in the flow system is referred to hereinafter as "dead volume" and has the additional disadvantage of increasing the system's response time.

Since the electrical conductivity of the flame is low, the measuring circuit must have a relatively high input impedance as has been described. This requirement creates many electrical insulating problems which are difficult to satisfactorily solve. A related problem area is that moisture associated with the water vapor produced by the hydrogen flame can cause relatively large leakage currents which interfere with the accuracy of the measurements.

An object of this invention is to reduce the dead volume of flame ionization detectors.

Another object of this invention is to provide an improved flame ionization detector having a reduced explosion hazard.

An additional object of this invention is to provide an improved flame ionization detector having reduced leakage currents.

In accordance with the invention, a flame ionization detector is constructed in which combustible gas is fed to a first jet and burned in a combustion gas atmosphere. A fluid stream to be analyzed is fed to a second jet positioned such that the fluid stream passes from the second jet, directly into the flame of the first jet, to be consumed. Since no mixing of streams need take place prior to combustion, the dead volume of the fluid stream is reduced appreciably. The electrical conductivity of the ionized gas in and immediately surrounding the flame is measured in conventional manner to provide an indication of the constituency of the sample stream.

In one embodiment of the invention the electrical isolation of the electrode is enhanced by using the combustion air for the flame to bathe the electrical insulation in the region of the flame. This prevents water vapor formed by the combination of hydrogen and oxygen in the flame from creating small leakage currents which would impair the accuracy of the flame conductivity measurements particularly with low sample concentrations.

Figure 2:
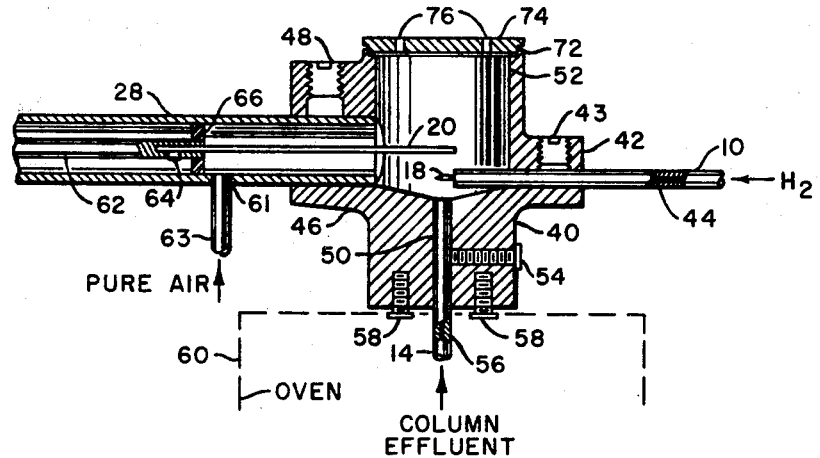

The novel features that are considered characteristic of this invention are set forth with particularity in the appended claims. The invention, itself, however, both as to its organization and method of operation, as well as additional objects and advantages thereof, will best be understood from the following description when read in connection with the accompanying drawings, in which:

FIGURE 1 is a schematic representation of a flame ionization detector constructed in accordance with the invention; and FIGURE 2 is a view shown partially in section of a preferred embodiment of the flame ionization detector of this invention.

In FIG. 1 there is shown a flame ionization detector which includes a combustible gas (hydrogen) nozzle or jet 10 having an axis illustrated by the dotted line 12. The sample stream or gas to be analyzed such as the effluent from the separating column of a gas chromatograph is passed to a separate and distinct nozzle or jet 14 having an axis illustrated by the dotted line 16. The two jets 10 and 14 are positioned such that their orifices 15 are in close proximity and their axes 12 and 16 intersect. The intersection of the axis of the sample jet 14 desirably is through the center portion of the flame 18 created by burning hydrogen gas from the jet 10.

In one embodiment of the invention that was successfully operated, both jets 10 and 14 had an orifice 18 mils in diameter and are typically 1/8" stainless steel tubing. Their length is not critical but that of the sample jet 14 should be maintained as short as possible to minimize dead volume. Both jets 10 and 14 may be connected to suitable tubing to receive hydrogen gas and column effluent, respectively, by conventional tubing connectors such as those sold by the Crawford Fitting Company under the trademark Swaglok. The tips of the jets 10 and 14 may actually touch if desired and in fact has produced excellent operating results. Their precise angular and spacial relationship is not critical, nevertheless for each detector an optimum relationship does exist and may be determined by simple experimentation to maximize the electrometer output signal.

An electrode 20, which may be formed of platinum or other suitable nonreactive, electrically conductive material, is positioned immediately adjacent or contiguous to the flame 18. In a typical case the electrode 20 is positioned immediately in and above the flame 18 and is formed in the shape of a ring or plate. Placement of the electrode actually in the flame 18 produces excessive noise and is generally to be avoided. If desired the electrode 20 may be in the form of a cylinder enclosing the flame 18. Its function is to measure the electrical conductivity of the flame which is accomplished by passing an electrical current through the flame between the electrode 20 and the jets 10 and 14 which are grounded.

The jets 10 and 14 are mounted by suitable means within a closed housing 22 of suitable material such as stainless steel capable of withstanding high temperatures. The top portion (in the drawing) of the housing 22 is enclosed by a stainless steel screen 30 to permit the exhaust of combustion products. Combustion air is introduced into the lower portion of the housing 22 through a tube 28. Combustion gas introduced through the tube 28 flows upwardly about the flame 18 and out through the screen 30. The combustion gas may be either pure air or oxygen. The electrode 20 is coupled through the wall of the housing 22 by a suitable electrically nonconductive insulator 24 to an electrometer or other suitable amplifier 26 having a relatively high input impedance. Since the electrical portion of the flame ionization detectors is relatively well known, little further need be said in describing the electrometer amplifier.

In operation, hydrogen gas from jet 10 is burned in the presence of combustion air to produce the flame 18. The combustion products are exhausted upwardly through the screen 30. In like manner the sample stream, say the effluent from the column of a gas chromatograph, is passed directly through the sample jet 14 into the flame 18. As different sample components are eluted from the column, the ionization and hence the electrical conductivity of the flame 18 varies. These variations in conductivity are converted to a voltage and amplified by the electrometer amplifier which provides an output electrical signal of varying amplitude. The amplitude of the signal is indicative of the conductivity of the flame and hence the concentration of the organic constituents eluted from the column.

One advantage of the invention is that since the output of the column is connected directly to the sample jet 14, the dead volume of the detector is considerably reduced and the response time of the detector correspondingly decreased. Since the combustion air is never mixed with the hydrogen gas, there is little possibility of the hydrogen gas diffusing back into the flow system and causing an explosion due to the heat of the oven, for example. Finally, since the hydrogen and oxygen are neither mixed with the sample prior to burning, the possibility of these elements reacting chemically with the organic sample constituents is small.

A particular structural embodiment of the invention is illustrated in FIG. 2. In this figure there is shown a generally cylindrical housing 40, which may be cast of aluminum or other suitable material. An axial bore 50 is formed in the lower position (in the drawing) of the housing 40 and a counter bore is formed in the upper portion of the housing 40 to provide a combustion chamber 52. The housing 40 is formed to have a boss 42 on its periphery to permit the mounting of the hydrogen jet 10 in a radial port formed in the boss 42. The hydrogen jet 10 is held in position by a set screw 43 in the boss 42. The hydrogen jet 10 includes a capillary conduit 44, as shown by the partially cut out section, to transmit hydrogen gas to support the flame 18.

The housing 40 includes a second peripheral boss 46 adapted to position an electrode housing tube 28'. Tube 28' may be any suitable tubing (stainless steel is preferred) and is held in position in a radial port formed in the boss 46 by a set screw 48.

The sample jet 14 is positioned in the axial bore 50 and held in place by suitable means such as a set screw 54. The sample jet 14 has a capillary-sized conduit 56 as shown in the partially cut-out section through which column effluent from the chromatograph or other sample stream is passed. The lower end face of the housing 40 includes two threaded tapped holes 58 to permit the housing 40 to be mounted directly on top of the oven housing, illustrated in part by the dotted lines 60, for example, of a gas chromatograph. In this manner, the heat from the oven 60 is usually sufficient to maintain the detector at suitable temperature to prevent the fluid stream constituents from condensing. If the heat transfer by this method is insufficient, a simple cartridge heater may be included by means of a bore formed in another peripheral axial boss (not shown) on the housing 40.

The electrode 20 is positioned coaxially in a bore formed in one end of an electrically conducting rod 62. The electrode 20 is held by a set screw 64 radially located in the rod 62. In turn, the rod 62 is coaxially positioned within the tube 28' by means of an insulating washer 66 made, for example, of a suitable plastic such as nylon. Several washers may be used as required. A radial port 61 is tapped in the tube 28' between the washer 66 and the chamber 52 and a conduit or tube 63 from a source of combustion air (pure air or oxygen) inserted in the port 61 and silver soldered or otherwise suitably secured to the tube 28'. The flow of the pure air through the electrode housing tube 28' and the combustion chamber 52 has the particular advantage of continually bathing the electrode 20 and one side of the insulating washer 66 with dry air which is then exhausted through perforations 76 in a disc like cap 74 which encloses the combustion chamber 52. The disc like cap 74 may be stainless steel suitably recessed as at 72 to facilitate its mounting. The dry air tends to evaporate any moisture resulting from the hydrogen flame and thereby prevents any unwanted leakage currents due to the moisture from impairing the accuracy of the conductivity measurements. These leakage currents are particularly undesirable inasmuch as the flame impedance is relatively high in the order of $10^{12}$ to $10^{14}$ ohms; thence, any moisture at all can cause leakage current of appreciable magnitude in relation to the ionization current in the flame.

The remainder of the detector operation is the same as that described in FIG. 1 with the same attendant advantages. In this instance it should be noted that the hydrogen jet 10 is horizontally disposed and the sample jet 14 is vertically disposed. This particular configuration has the advantage of insuring that substantially all of the vertically directed eluted sample components are consumed by the hydrogen flame 18.

There has thus been described an improved flame ionization detector in which the danger of hydrogen explosion or the problems incurred by the hydrogen acting as a reducing agent on some of the sample componetns is removed because it never encounters the components except in the form of a high temperature hydrogen flame. At this time the encounter is only sufficient to consume the organic components which is the reaction desired. Since the output of the gas chromatograph column or sample stream is connected directly to the sample jet 14, the dead volume is small.

It will be obvious that various modifications may be made in the apparatus and in the manner of operating it. It is intended to cover such modifications and changes as would occur to those skilled in the art, as far as the following claims permit and as far as consistent with the state of the prior art.

What is claimed is:

1. Apparatus for detecting the presence of organic substances in a sample stream comprising:
   a combustible gas burner jet having a first axis, means to feed combustible gas at a constant rate to said burner jet,
a sample jet having a second axis intersecting said first axis, said sample jet being positioned to impinge a gas on the flame position of a flame from said burner jet,
means to feed the sample stream to said sample jet,
a metallic electrode positioned adjacent said flame position,
and means to measure the electrical conductivity of at least a portion of the region of said flame position.

2. Apparatus for detecting the presence of organic substances in a sample stream comprising:
a combustible gas burner jet having a first axis,
means to feed combustible gas at a constant rate to said burner jet,
means to supply a combustion gas to the region of said burner jet,
a sample jet having a second axis intersecting said first axis, said sample jet being positioned to impinge a gas on the flame position of a flame from said burner jet,
means to feed the sample stream to said sample jet,
a metallic electrode positioned adjacent said flame position,
and means to measure the electrical conductivity of at least a portion of the region of said flame position.

3. Apparatus for detecting the presence of organic substances in a sample stream comprising:
a combustible gas burner jet having a first axis,
means to feed only combustible gas at a constant rate to said burner jet,
means to supply a combustion gas to the region of said burner jet,
a sample jet having a second axis intersecting said first axis, said sample jet being positioned to impinge a gas on the flame position of a flame from said burner jet,
means to feed only the sample stream to said sample jet,
a platinum electrode positioned contiguous to said jets,
means to electrically insulate said electrode from said jets,
and means to measure the electrical conductivity between said electrode and said jets.

4. The apparatus set forth in claim 3 which also includes means to direct said combustion gas over said means to electrically insulate said electrode, thereby to prevent the occurrence of leakage currents due to moisture.

5. The combination set forth in claim 3 wherein said combustion gas is oxygen, said jets are connected to a point of reference potential, and said electrode is connected to a potential different from said reference potential.

6. The combination set forth in claim 3 wherein said combustible gas is hydrogen.

7. The combination set forth in claim 6 wherein said combustible gas burner is horizontally disposed.

8. The combination set forth in claim 7 wherein said sample jet is vertically disposed and said electrode is positioned substantially on the axis of said burner jet.

9. Apparatus for detecting the presence of organic substances in a sample stream eluted from the separating column of a gas chromatograph comprising:
a housing having an axial bore formed therein, said bore being counter bored thereby to form an enlarged cylindrical combustion chamber,
a burner jet having an axis positioned in said housing radially of said combustion chamber and protruding therein substantially to the axis of said bore,
means to feed hydrogen at a constant rate to said burner jet,
a sample jet positioned in said housing bore and protruding into said combustion chamber to a point immediately adjacent the flame position of a flame from said burner jet,
means to connect said separating column directly to said sample jet, thereby to reduce the dead volume of the sample stream,
means to supply combustion gas to said combustion chamber,
a metallic electrode,
electrically insulating mounting means in the housing for positioning said electrode adjacent said flame position,
means to direct said combustion gas over said mounting means, thereby to prevent the existence of moisture on said mounting means,
and means to measure the electrical conductivity of at least a portion of that region of said flame position between said electrode and one of said jets.

10. Apparatus for detecting the presence of organic substances in a sample stream eluted from the separating column of a gas chromatograph comprising:
a housing having an axial bore formed therein, said bore being counter bored thereby to form an enlarged combustion chamber,
a burner nozzle having an axis positioned in said housing radially of said combustion chamber and protruding therein substantially to the axis of said bore,
means to feed hydrogen at a constant rate to said burner nozzle,
a sample nozzle positioned in said housing bore and protruding into said combustion chamber to a point immediately adjacent the flame position of a flame from said burner nozzle,
means to connect said separating column directly to said sample nozzle, thereby to reduce the dead volume of the sample stream,
means to supply oxygen to said combustion chamber,
a metallic electrode,
electrically insulating mounting means in the housing for positioning said electrode adjacent said flame position,
means to direct said oxygen over said mounting means, thereby to prevent the existence of moisture on said mounting means,
and means to measure the electrical conductivity of at least a portion of that region of said flame position between said electrode and one of said nozzles.

11. The combination set forth in claim 10 wherein said combustion chamber has an open end axially opposite said bore and which also includes a disc-like cap having a gas vent, said cap being positioned over the open end of said combustion chamber.

12. The combination set forth in claim 11 which also includes a tube radially positioned in the wall of said combustion chamber, said electrode being fixedly mounted coaxially within said tube and electrically insulated from the walls thereof, and means to feed said oxygen through said tube to the said combustion chamber, thereby to enhance the electrical insulation of said electrode.

References Cited

UNITED STATES PATENTS

| | | | |
|---|---|---|---|
| 2,714,833 | 8/1955 | Gilbert | 23—253 |
| 3,095,278 | 6/1963 | Green | 23—254 |
| 3,129,062 | 4/1964 | Ongkiehong et al. | 23—232 |

FOREIGN PATENTS

| | | |
|---|---|---|
| 698,880 | 6/1964 | Canada. |

MORRIS O. WOLK, *Primary Examiner.*

R. E. SERWIN, *Assistant Examiner.*